United States Patent Office 2,705,238
Patented Mar. 29, 1955

2,705,238

STEROID-DIMETHYLAMINES AND THEIR QUATERNARY HALIDES

Percy L. Julian, Maywood, and Helen C. Printy and Edwin W. Meyer, Chicago, Ill., assignors to The Glidden Company, Cleveland, Ohio, a corporation of Ohio No Drawing. Application May 19, 1951, Serial No. 227,272

4 Claims. (Cl. 260—397.3)

The present invention relates to 17-dimethylamino steroids and their production.

This application is a continuation-in-part of application Serial No. 773,526, filed September 11, 1947, now Patent No. 2,561,378. In that application there is disclosed the preparation of dimethylamines of both saturated and unsaturated steroids in which the dimethylamino group is either attached to the 17-carbon atom or is in a group attached to the 17-carbon atom of the steroid nucleus. The instant case is directed to that portion of the original subject matter pertaining to the 17-dimethylamines and covered by original claims 2 and 23 of the parent application.

It is accordingly an object of the present invention to provide a method for the production of 17-dimethylamines of the steroid series.

Another object is to provide 17-dimethylamines of the steroid series.

Other objects will be apparent to those skilled in the art from the following description.

It has been found that the dimethylamines of the present invention can be prepared by the reductive methylation of the corresponding 17-amine with formaldehyde and formic acid. Thus, amines of the type R—NH$_2$, where R is a cyclopentanopolyhydrophenanthrene nucleus and the —NH$_2$ group is attached to the 17-carbon atom of the nucleus may be readily methylated to the compounds of the type

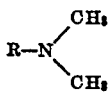

We have found that the quaternary ammonium halides of the dimethylamines of the present invention, and particularly the iodides, possess bacteriostatic properties against gram positive organisms.

The following examples are illustrative of the invention.

EXAMPLE I

3-hydroxy-5-androstene-17-dimethylamine 25 g. of 3-hydroxy-5-androstene-17-amine was added with cooling and shaking to 24 cc. of 90% formic acid. The slurry became brown. Then 17 cc. of 35–38% aqueous formaldehyde was added and the mixture was heated for four hours under reflux on the steam cone. The solid dissolved with copious evolution of CO$_2$. The solution was concentrated under vacuum to a thick sirup which was taken up in a mixture of ether and 5% aqueous hydrochloric acid. The acidic layer was made basic with 10% sodium hydroxide and the amine extracted with ether. The ether solution was washed several times with water, dried and concentrated to about 150 cc. After chilling, the separated solid was filtered and washed with petroleum ether. Another crop was obtained from the mother liquor. There resulted 19.0 g. of white crystalline 3-hydroxy-5-androstene-17-dimethylamine, M. P. 208–213° C.

EXAMPLE II

3-keto-17-dimethylamino-4-androstene

A solution of 3,6 g. of 3-keto-4-androstene-17-amine acetate in 3.6 g. of formic acid and 2.6 g. of 35% aqueous formaldehyde was heated on the steam bath under reflux for four hours. Carbon dioxide was liberated. The liquid was diluted with sodium carbonate solution and extracted with benzene-chloroform. The extract was washed with water followed by dilute hydrochloric acid. The acidic extract was made alkaline with sodium carbonate solution and extracted with benzene-chloroform. The extract was then washed with water and dried. Concentration gave the crude 3-keto-5-androstene-17-dimethylamine. This material can be crystallized from ether-petroleum ether, B. P. 35–60° C., after treatment with activated alumina.

EXAMPLE III

3-acetoxy-5-ternorcholenyldimethylamine

A mixture of 20.5 g. of 3-acetoxy-5-ternorcholenylamine acetate, 17.85 g. of 90% formic acid and 35% aqueous formaldehyde was heated on a steam bath for five hours. Carbon dioxide was liberated at the beginning of the heating period. The mixture was diluted with water. After the addition of ether and dilute hydrochloric acid, the mixture was shaken and the aqueous layer containing suspended insoluble hydrochloride was separated. The aqueous suspension was made alkaline with dilute sodium carbonate solution and extracted with ether. The extract was washed with water and dried. Upon removal of solvent, there remained 17.8 g. of crude 3-acetoxy-5-ternorcholenyldimethylamine, M. P. 153–175° C. Recrystallization from ether gave pure material melting at 185.6–187.5° C.

EXAMPLE IV

3-acetoxy-allo-ternorcholanyldimethylamine 4.2 g. of 3-acetoxy-allo-ternorcholanylamine acetate was mixed with 3 g. of 90% formic acid and 2 g. of 35% aqueous formaldehyde solution and heated on a steam bath for four hours. The solution was then concentrated under vacuum, diluted with 5% hydrochloric acid and extracted with ether. The acidic aqueous layer was made alkaline with 10% sodium hydroxide solution and extracted with ether. The ether extract was washed with water and dried. The residue remaining after removal of solvent was crystallized from benzene. The crude 3-acetoxy-allo-ternorcholanyldimethylamine melted at 147–153° C.

EXAMPLE V

3α,12α-diacetoxy-ternorcholanyldimethylamine

The acid chloride was prepared from 7.2 g. of 3α,12α-diacetoxy-bisnorcholanic acid and 4.2 cc. of thionyl chloride in 20 cc. of dry benzene-40 cc. of dry ether. After one hour the solvent was removed and the acid chloride was dissolved in 130 cc. of acetone. This solution was treated, dropwise, at 0–5° C. with a solution of 2.3 g. of sodium azide in 10 cc. of water. The mixture was stirred for twenty minutes and the azide precipitated by the addition of 200 cc. of cold water. The solid azide was separated, suspended in 130 cc. of 80% aqueous acetic acid and decomposed by heating to 50–60° C. for one hour. The clear solution was steam distilled, neutralized with dilute sodium carbonate solution and extracted with ether. The washed and dried ether solution gave upon concentration 6.2 g. of crude 3α,12α-diacetoxy-ternorcholanylamine, acetamide derivative, M. P. 220–221° C.

The crude amine was methylated by heating 5.2 g. in 6 cc. of 90% formic acid and 4 cc. of 35% aqueous formaldehyde on the steam bath under reflux for four hours. The orange liquid was poured into cold dilute sodium hydroxide and extracted with ether. The ether solution was washed with water, dried and concentrated under vacuum. The resulting amorphous material, 3.5 g., was crystallized from petroleum ether, B. P. 35–60° C., yielding small needles of 3α,12α-diacetoxy-ternorcholanyldimethylamine melting at 134–137° C.

From the foregoing examples, it is apparent that the reductive methylation may be carried out on compounds possessing a wide variety of substituents attached to nuclear carbon atoms. It will be understood that various modifications may be made therein without departing from the spirit and scope of the invention. Thus, various acyloxy derivatives other than the acetoxy, such as the propionoxy, benzoxy, etc. derivatives, may be employed, as well as compounds possessing keto groups in the 11- or 12-positions, since the invention is not dependent on the presence or absence of such groups.

Also, when producing a hydroxy-dimethylamine, it may be desirable to esterify the hydroxy group before carrying out subsequent reactions, especially those which are directed to the introduction of additional hydroxy groups. In some instances it may be desirable to treat this group with reagents which would also react on other OH groups, if present. By esterifying hydroxy groups present in the dimethylamine, subsequent preferential esterification can be avoided. Any suitable acid may be used for this purpose.

Moreover, when treating compounds containing keto groups, it is desirable to employ the amine in the form of a salt, such as is shown in Example II, in order to prevent condensation of the keto group with the —NH₂ group to form a Schiff's base. Any suitable acid may be used in this case to form the salt.

Having described the invention, what is claimed is:

1. The process which comprises subjecting a primary 17-amino-steroid to a reductive methylation with formaldehyde and formic acid to form a 17-dimethylamino steroid.
2. 3-hydroxy-17-dimethylamino-5-androstene.
3. 3-keto-17-dimethylamino-4-androstene.
4. 10,13-dimethyl-17-dimethylamino steroids of the $C_{19}$ series.

References Cited in the file of this patent

UNITED STATES PATENTS

| | | |
|---|---|---|
| 2,289,235 | Bockmuhl | July 7, 1942 |
| 2,292,080 | Marker | Aug. 4, 1942 |